Figure 1:
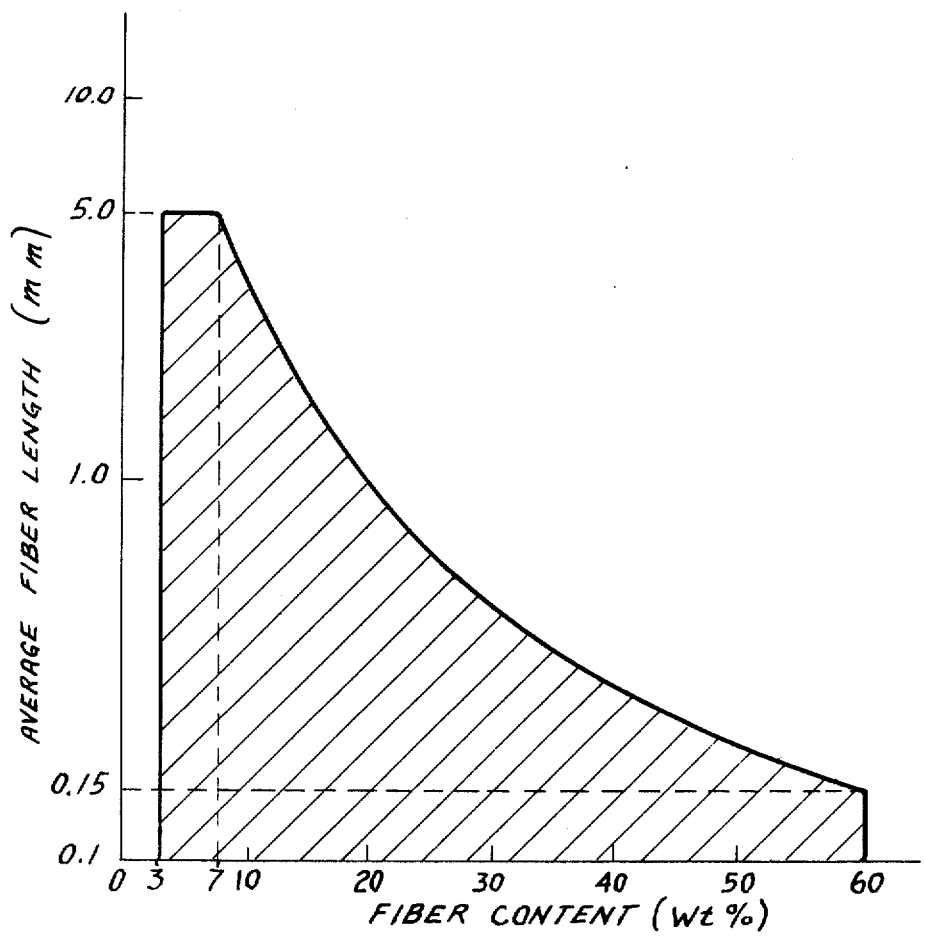

United States Patent
Takita et al.

[11] 3,882,077
[45] May 6, 1975

[54] PROCESS FOR PREPARING CARBON FIBER-REINFORCED POLYAMIDE RESINS

[75] Inventors: Hitoshi Takita, Tokyo; Katsuo Take, Otsu, both of Japan

[73] Assignees: Toyo Boseki Kabushiki Kaisha, Osaka, Japan; Kureha Chemical Industry Co., Nihonbashi, Japan

[22] Filed: Oct. 23, 1973

[21] Appl. No.: 408,880

[30] Foreign Application Priority Data
Oct. 23, 1972 Japan.............................. 47-105324

[52] U.S. Cl.............................. 260/37 N; 106/307
[51] Int. Cl.............................................. C08g 51/04
[58] Field of Search.................. 260/37 N; 423/447; 106/307

[56] References Cited
UNITED STATES PATENTS
3,419,517   12/1968   Hedrick et al..................... 260/37 N
3,705,236   12/1972   Ishikawa et al..................... 423/447

FOREIGN PATENTS OR APPLICATIONS
1,234,208   6/1971   United Kingdom

Primary Examiner—Donald E. Czaja
Assistant Examiner—S. M. Person
Attorney, Agent, or Firm—Kaufman & Kramer

[57] ABSTRACT

A process for preparing a carbon fiber-reinforced polyamide resin excellent in mechanical properties including strength, elasticity, water resistance, fatigue characteristics and abrasion resistance, particularly in abrasion resistance, which comprises incorporating carbon fibers of about 0.1 to 5 mm in average length into the polymerization system of monomeric components capable of forming a polyamide resin prior to or during the polymerization and then accomplishing the polymerization.

4 Claims, 3 Drawing Figures

PROCESS FOR PREPARING CARBON FIBER-REINFORCED POLYAMIDE RESINS

The present invention relates to a process for preparing a carbon fiber-reinforced polyamide resin. More particularly, it relates to a process for preparing a carbon fiber-reinforced polyamide resin excellent in mechanical properties, especially in abrasion resistance.

Hitherto, various proposals have been made to improve the physical and mechanical properties of thermoplastic resins such as strength, elasticity, heat resistance, creep characteristics and dimensional stability by incorporating inorganic fibers such as glass fibers and asbestos and/or various whiskers into the thermoplastic resins. When, however, the thus obtained reinforced resins are used in such a state as sliding on the surface of mechanical articles or parts made of any material of the same or different kind, for instance, as gears, bearings or cams, the abrasion resistance is quite unsatisfactory and the said surface is considerably injured. As the result, the maintenance of the dimensional accuracy is made difficult. The use of carbon fibers as fillers has also been proposed but the improvement in the physical and mechanical properties of the molded products made of the resulting reinforced resins such as strength, elasticity, heat resistance, creep characteristics, dimentional stability and fatigue characteristics as well as abrasion resistance is not sufficient.

An attempt has been made to improve the physical and mechanical properties of polyamide resins by incorporating carbon fibers therein. However, the melt blending of a polyamide resin with carbon fibers can not afford a uniform dispersion due to a poor compatibility between the polyamide resin and the carbon fibers so that a molded product made of the resulting blend mixture has only inferior physical and resin and the carbon fibers so that a molded product made of the resulting blend mixture has only inferior physical and mechanical properties, and the carbon fibers unevenly dispersed in the molded product make blocks, which are apt to injure the surface of any other mechanical article or part when the molded product moves slidably thereon.

As the results of the extensive study, it has now been found that the polymerization of monomeric components capable of forming a polyamide resin in the presence of carbon fibers of certain average length can provide a polyamide resin containing carbon fibers uniformly dispersed therein and a molded product made of such polyamide resin is excellent in various physical and mechanical properties including strength, elasticity, water resistance, fatigue characteristics and abrasion resistance and, even when slided against any other material without any lubrication, hardly injures the same. This invention is based on the above finding.

According to the present invention, there is provided a process for preparing a carbon fiber-reinforced polyamide resin which comprises incorporating carbon fibers of about 0.1 to 5 mm in average length into the polymerization system of monomeric components capable of forming a polyamide resin prior to or during the polymerization and then accomplishing the polymerization.

As the monomeric components capable of forming a polyamide (hereinafter referred to as "polyamide-forming monomeric components"), there may be exemplified lactams having four to 12 carbon atoms (e.g. ε-caprolactam, enantholactam, caprylolactam, laurylolactam) and their corresponding aminocarboxylic acids, nylon salts (e.g. hexamethylenediammonium adipate, hexamethylenediammonium isophthalate, polyxylylenediammonium isophthalate, polyxylylenediammonium adipate), etc.

The carbon fibers may be originated from any carbon source. Typical examples of the carbon source are pitch, acrylonitrile, cellulose, lignin, etc. Among them, particularly preferred is carbon fibers originated from various pitches which are obtained from polyvinyl chloride, petroleum, coal tar and the like (hereinafter referred to as "pitch precursor fibers").

The preparation of the carbon fibers may be effected by any conventional manner. For instance, the carbonization of fibers of organic materials such as acrylic fibers, rayons and lignin fibers while retention of their original forms can afford acrylonitrile precursor fibers, cellulose precursor fibers, lignin precursor fibers, etc. Further, for instance, pitch precursor fibers may be prepared by molding a pitch or resinous material of high carbon content in fibers according to a melt spinning process, subjecting the fibers to treatment for making infusible and carbonizing the infusible fibers. One of the typical procedures for preparation of pitch precursor fibers is as follows: dry distilling a pitch (e.g. petroleum pitch, coal tar pitch, natural asphalt) having a carbon content of about 91 to 9% by weight and an average molecular weight of more than about 400 at a temperature of about 300° to 400°C under atmospheric pressure or reduced pressure; melt spinning the resultant product into filaments at a temperature below about 350°C; making the resulting filaments infusible by treatment with air or oxygen containing ozone at a temperature from room temperature to 100°C for a certain period of time less than 7 hours, followed by treatment with air at a temperature below about 260°C; carbonizing the thus obtained filaments in the absence of any oxidative gas such as air at a temperature of not lower than about 600°C [Japanese Pat. No. 4550/1968].

The carbon fibers to be used in the process of this invention are required to be from about 0.1 to 5.0 mm in average length. When the average length is less than about 0.1 mm, the reinforcing effect is not sufficient. When it is more than about 5.0 mm, the fluidity of the produced polyamide resin in a melt state is lowered so that the smooth discharge of such polyamide resin from the reaction apparatus becomes difficult. As to the diameter of the carbon fibers, any specific limitation is not present, but it may be usually from about 5 to 20 μ.

For preparation of the carbon fibers of said specific size, any organic filaments available as their source may be chopped into desired lengths and then carbonized by a conventional procedure. Alternatively, carbon filaments prepared by carbonization of an organic material may be chopped into desired lengths. One of the presently preferred procedures is as follows: melt spinning the pitch into filaments applying hot air heated at about 150°C with a velocity of about 150 m/min to the extruded filaments at right angles to the filaments [Japanese Pat. No. 32148/1972].

The amount of the carbon fibers to be incorporated into the polyamide-forming monomeric components may be appropriately decided taking the properties of the resulting carbon fiber-reinforced polyamide resin into consideration. In general, the use of a larger amount may result in higher improvements of the mechanical characteristics (e.g. strength, elasticity, creep characteristics), thermal characteristics (e.g. linear expansion), dimensional stability against moisture, abrasion characteristics, etc. Usually, the amount of the carbon fibers may be from about 3 to 60% by weight of the total weight of the said monomeric components and the carbon fibers. The amount and the size of the carbon fibers affords a considerable influence on the fluidity of the resulting dispersion and the dispersion state of the carbon fibers. Therefore, the selection of a suitable fiber length depending on the amount to be employed is desirable. In case of the amount being not more than about 10% by weight, for instance, the use of the carbon fibers of about 5 mm in average length is possible. In case of the amount being not less than about 20% by weight, the use of the carbon fibers of not more than about 1 mm in average length is desirable. From the practical viewpoint, the use of the carbon fibers of which the amount to be employed and the average length have a relationship almost within the hatched area in FIG. 1 of the accompanying drawings is generally preferred. When the amount of the carbon fibers is increased beyond 60% by weight, the resultant dispersion has only a poor fluidity even if the length of the carbon fibers is about 0.1 mm.

When desired, a carbon fiber-reinforced polyamide resin having a larger content of the carbon fibers may be blended with another carbon fiber-reinforced polyamide resin having a smaller content of the carbon fibers to make a carbon fiber-reinforced polyamide resin having a desired content of the carbon fibers, both of the said starting polyamide resins having been prepared by a procedure as hereinafter illustrated. The said carbon fiber-reinforced polyamide resin having a smaller content of the carbon fibers in the above blending may be replaced by a polyamide resin containing no carbon fibers.

In the present invention, the carbon fibers are incorporated into the polymerization system of the polyamide-forming monomeric components prior to or during the polymerization, and then the polymerization of the resulting mixture is completed.

The polymerization may be carried out in a conventional manner which is usually adopted for production of polyamide resins.

In case of the incorporation of the carbon fibers being effected prior to the polymerization, the polymerization may be carried out, for instance, by adding the carbon fibers to a heat melted mixture of the polyamide-forming monomeric components (e.g. ε-caprolactam) in water while stirring; charging the resulting mixture in an autoclave; after replacement of the atmosphere by nitrogen, heating the resultant mixture at about 210° to 270°C for about 2 hours while stirring in a closed system; after release of the water vapor to make an atmospheric pressure, continuing the stirring for about 3 hours while maintaining the said temperature under the atmospheric pressure; and then allowing the resultant mixture to stand for about 1.5 hours so as to complete the polymerization.

In case of the incorporation of the carbon fibers being effected during the polymerization, the polymerization may be carried out, for instance, by charging a heat melted mixture of the polyamide-forming monomeric components in water into an autoclave; executing the polymerization under the substantially same condition as above; adding the carbon fibers to the reaction mixture before the melt viscosity of the reaction mixture reaches to about 3,000 poise, preferably about 1,000 poise; and then continuing the polymerization up to completion.

After completion of the polymerization, the produced polymer is taken out from the reaction vessel and pelletized in a conventional manner, if necessary, followed by washing with water and drying to obtain the desired carbon fiber-reinforced polyamide resin. The polyamide resin may contain any additive such as pigments, ultraviolet absorbents, fire retardant agents, antistatic agents, lubricating agents and nucleating agents.

The thus produced carbon fiber-reinforced polyamide resin is extremely good in the dispersing state of the carbon fibers and also in the compatibility of the carbon fibers. The molded product obtained by molding such polyamide resin is much superior to that of the melt blended mixture of the corresponding polyamide resin containing no carbon fibers with the carbon fibers in mechanical properties such as strength, elasticity, water resistance, abrasion resistance and fatigue characteristics.

Particularly when the pitch precursor fibers are used, the molded product of the resulting carbon fiber-reinfored polyamide resin is quite excellent in strength, elasticity and water resistance. It is especially notable that, through the modulus of elasticity of the pitch precursor fibers is low, the resulting molded product exhibits excellent mechanical characteristics.

In view of the excellent properties as above, the carbon fiber-reinforced polyamide resin of the invention is useful as the material for manufacture of mechanical articles and parts, particularly those which are employed in a sliding movement on the surface of any other mechanical article or part. For instance, it may be used for the manufacture of bearings, rolling articles, sliding surfaces of machines, piston rings, gears, cams, etc.

Practical and presently preferred embodiments of this invention are illustratively shown in the following Examples. In these Examples, the measurements of the mechanical properties are made as follows: tensile strength and tensile modulus of elasticity, ASTM-D638; bending strength and bending modulus of elasticity, ASTM-D790; abrasion characteristics, chimken's method (condition: slide ring "SUS-27"; TV value 450 kg/cm$^2$.m/sec.).

EXAMPLE 1

A mixture of ε-caprolactam (2,700 g), water (270 g) and acetic acid (2.45 g) is heated at 80°C. To the resulting melted mixture, there are added pitch precursor fibers of low modulus of elasticity having 2.5 mm in average length (300 g) while stirring to make a uniform dispersion. The uniform dispersion is charged in a 5 liter volume autoclave and, after replacement of the atmosphere by nitrogen, heated at 270°C while stirring for 2 hours in a closed system. The water vapor is released to an atmospheric pressure, and stirring is continued for 3 hours while maintaining the said temperature. Then, stirring is interrupted, and the reaction mixture is allowed to stand for 1.5 hours whereby the polymerization is completed. The polymer is taken out from the autoclave in a string form of 2 mm in diameter and immersed in a water. The string is cut in pellets of 3 mm long, and the pellets are washed with hot water of 100°C and dried under reduced pressure to give polycapramide chips containing 9.9% by weight of carbon fibers. The chips are subjected to injection molding to make a sheet of 6.3 mm in thickness and 12.75 mm in width [hereinafter referred to as "sheet (A)"].

The sheet (A) before and after treatment for water absorption at 60°C for 4 hours is subjected to measurement of tensile strength and modulus of elasticity according to the standard method. The sheet (A) is also subjected to an abrasion test using a piece of stainless steel "SUS-27" as a partner material under the conditions of a charge of 15 kg/cm$^2$ and of a sliding speed of 30 m/min, and the amount of abrasion and the surface state of the partner material are measured by the aid of an abrasion test machine.

For comparison, pitch precursor yarns of low modulus of elasticity (1,500 denir) are coated with a polycapramide resin according to a wire coating procedure, and the coated yarns are cut to make chips of 3 mm long containing 10% by weight of carbon fibers. The chips are subjected to injection molding to make a sheet of 6.3 mm in thickness and 12.75 mm in width [hereinafter referred to as "sheet (B)"].

The sheet (B) is subjected to measurement of tensile strength and modulus of elasticity and also to determination of abrasion characteristics as in case of the sheet (A).

The results are shown in Table 1.

Table 1

| Property | Sheet A | Sheet B |
| --- | --- | --- |
| Tensile strength (kg/cm$^2$) | | |
| Before water absorption | 760 | 750 |
| After water absorption | 500 | 300 |
| Tensile modulus of elasticity (ton/cm$^2$) | | |
| Before water absorption | 38 | 39 |
| After water absorption | 29 | 20 |
| Abrasion characteristics | | |
| Amount of abrasion (cm$^3$.min/kg.m.hr) | 70 × 10$^{-8}$ | 76 × 10$^{-8}$ |
| Surface state of other material | Scarcely injured | Injured |

From Table 1, it is seen that no material difference is present between the sheets (A) and (B) in tensile strength and tensile modulus of elasticity before water absorption but the properties of the sheet (A) after water absorption are much more excellent than those of the sheet (B). It is also seen that the abrasion resistance of the sheet (A) is higher than that of the sheet (B) and the sheet (A) injures more scarcely the other material than the sheet (B) does.

EXAMPLE 2

As in Example 1, pitch precursor fibers of low modulus of elasticity of 0.5 mm in average length are dispersed into ε-caprolactam in various proportions, and polymerization is carried out to make polycapramide chips. The chips are subjected to injection molding as in Example 1 to make a sheet of 6.3 mm in thickness and 12.75 mm in width [hereinafter referred to as "sheet (C)"].

The sheet (C) is subjected to measurement of bending strength (T$b$) and bending modulus of elasticity (E$b$).

For comparison, pitch precursor fibers of low modulus of elasticity of 3 mm in average length are dry blended with powdery polycapramide of 15,000 in molecular weight by the aid of a Henschel mixer, and the resulting blend is melt extruder by the aid of a screw extruder [length (L)/diameter (D) = 25; D = 40 $\phi$] at a cylinder temperature of 260°C to give carbon fiber-containing polyamide chips. The chips are subjected to injection molding to make a sheet of 6.3 mm in thickness and 12.75 mm in width [hereinafter referred to as "sheet (D)"].

The sheet (D) is subjected to measurement of bending strength (T$b$) and bending modulus of elasticity (E$b$).

Figure 2:
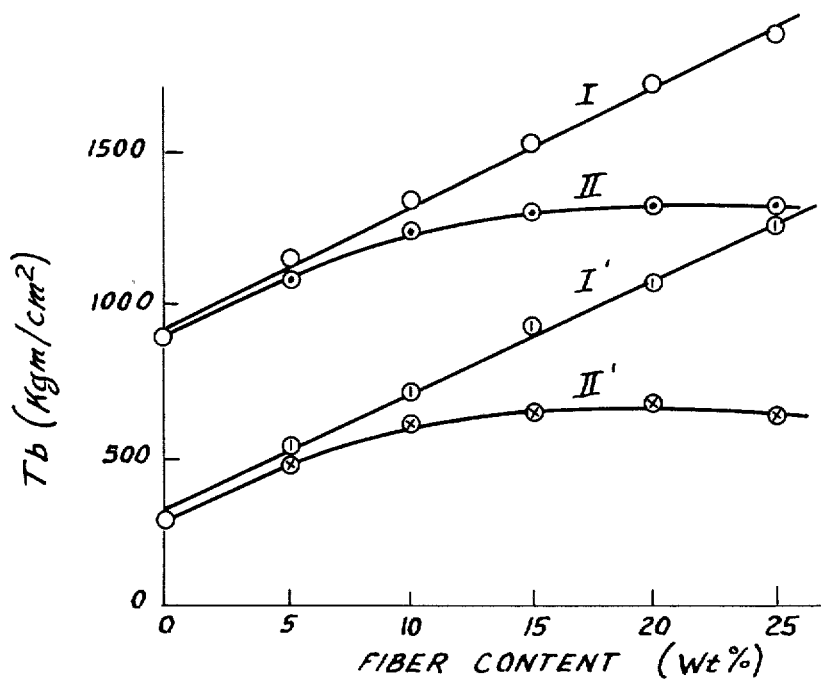
Figure 3:
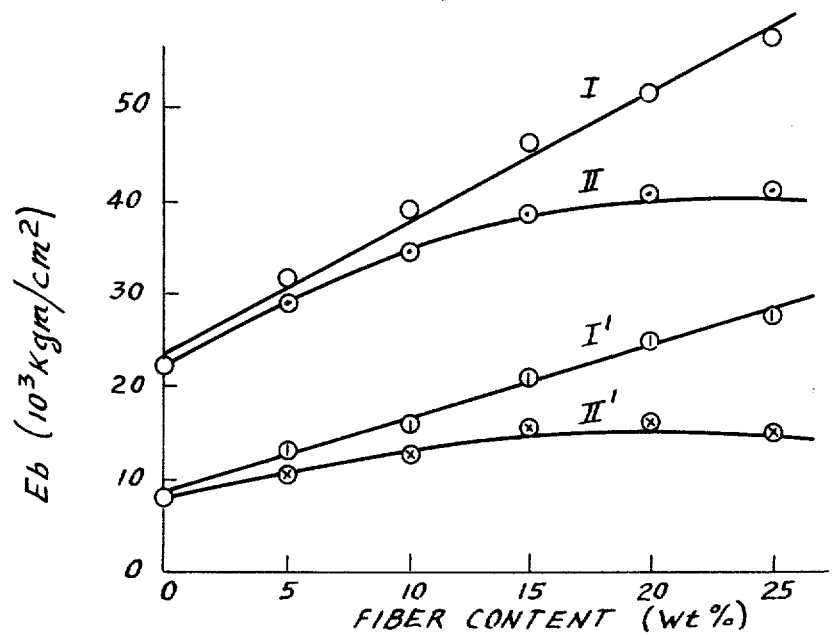

The relationships between the carbon fiber content (i.e., the weight percentage of carbon fibers in the sheet) and the bending strength (T$b$) and between the carbon fiber content and the bending modulus of elasticity (E$b$) are respectively shown in FIGS. 2 and 3 of the accompanying drawings. In these Figures, (I) and (I') indicate the values on the sheet (C) before water absorption and after water absorption, respectively. (II) and (II') indicate the values on the sheet (D) before water absorption and after water absorption, respectively.

From these FIGURES, it is seen that the sheet (C) exhibits more excellent bending strength and bending modulus of elasticity than the sheet (D) does. It is also seen that, in case of the sheet (C), the values are made higher with the increase of the carbon fiber content irrespective of before water absorption or after water absorption but, in case of the sheet (D), the increase of the carbon fiber content over a certain extent rather results in the decrease of the reinforced effect.

EXAMPLE 3

As in Example 1, pitch precursor fibers of 0.1 mm in average length is dispersed into ε-caprolactam at a content of 30% by weight, the dispersion is subjected to polymerization and the produced polymer is processed to make a sheet of 6.3 mm in thickness and 12.75 mm in width [hereinafter referred to as "sheet (E)"].

For comparison, the said carbon fibers are uniformly and sufficiently admixed with powdery polycapramide of 15,000 in molecular weight at the same content as above, the resultant mixture is melt extruded and the thus obtained carbon fiber-containing polyamide chips are processed to make a sheet of 6.3 mm in thickness and 12.75 mm in width [hereinafter referred to as "sheet (F)"].

The sheets (E) and (F) are subjected to measurement of bending strength, bending modulus of elasticity and abrasion amount after water absorption.

The results are shown in Table 2.

Table 2

| Property | Sheet E | Sheet F |
| --- | --- | --- |
| Bending strength after water absorption (kg/cm$^2$) | 1,350 | 500 |
| Bending modulus of elasticity after water absorption (ton/cm$^2$) | 30 | 11 |
| Abrasion amount | | |

Table 2-Continued

| Property | E | Sheet F |
|---|---|---|
| after water absorption (cm³.min/kg.m.hr) | $50 \times 10^{-8}$ | $60 \times 10^{-8}$ |

EXAMPLE 4

As in Example 1, pitch precursor fibers of 0.4 mm in average length (600 g) are dispersed in ε-caprolactam (2,400 g), the dispersion is subjected to polymerization and the chips of the produced polymer are injection molded to make a test piece of one-half inch in thickness, one-half inch in width and 5 inches in length [hereinafter referred to as "test piece (G)"].

For comparison, pitch precursor fibers of 3 mm in average length and powdery polycapramide are blended by the aid of a Henschel mixer, and the blended mixture is melt extruded into chips containing 20% by weight of carbon fibers. The chips are subjected to injection molding to make a test piece having the same size as above [hereinafter referred to as "test (H)"].

The test pieces (G) and (H) are immersed in water at 60°C, and the variation of the size depending on the amount of water absorbed thereby is measured.

The results are shown in Table 3.

Table 3

| Immersion time (hrs.) | 20 | 40 | 60 |
|---|---|---|---|
| Water absorption (% by weight) | | | |
| Test piece (G) | 1.9 | 2.2 | 2.5 |
| Test piece (H) | 2.0 | 2.3 | 2.7 |
| Percentage of size variation (%) | | | |
| 1) Vertical direction | | | |
| Test piece (G) | 0.6 | 0.6 | 0.6 |
| Test piece (H) | 0.8 | 0.9 | 1.0 |
| 2) Transverse direction | | | |
| Test piece (G) | 0.4 | 0.5 | 0.5 |
| Test piece (H) | 0.9 | 1.0 | 1.0 |
| 3) Machine direction | | | |
| Test piece (G) | 0.1 | 0.1 | 0.1 |
| Test piece (H) | 0.1 | 0.1 | 0.1 |

Further, the chips obtained as above are injection molded to make test pieces of 4 mm in thickness, 16 mm in width and 90 mm in length [hereinafter referred to as "test piece (I)" and "test piece (J)"]. The test pieces (I) and (J) are immersed in water at 60°C for 20 hours and then subjected to fatigue test using a repeated bending tester (UF-15 type, manufactured by Shimadzu Seisakusho Ltd.) at a speed of 1,800 cpm.

The results are shown in Table 4.

Table 4

| Stress cycle | $10^5$ | $10^6$ | $10^7$ |
|---|---|---|---|
| Fatigue strength (kg/cm²) | | | |
| Test piece (I) | 400 | 350 | 320 |
| Test piece (J) | 220 | 210 | 190 |

EXAMPLE 5

Hexamethylenediammonium adipate (425 g), 20% acetic acid (2.4 g) and water (290 g) are charged in an autoclave and, after replacement of the atmosphere by nitrogen, the mixture is heated while stirring in a closed system. When the inner pressure and the temperature reach respectively to 17 kg/cm² and 225°C, pitch precursor fibers of 1 mm in average length (250 g) are added thereto. The melt viscosity of the reaction mixture at this point is 10 poise. After the nitrogen is released to an atmospheric pressure in 90 minutes, stirring is continued at 270°C for 1 hour while maintaining the inner pressure at the atmospheric pressure. As in Example 1, the produced polymer is processed to make chips, which are subjected to injection molding to prepare a sheet.

The abrasion amount of the sheet is $72 \times 10^{-8}$ cm³·min/kg·m·hr. No injury is found on the surface of the other material after the abrasion test.

EXAMPLE 6

As in Example 1, pitch precursor fibers of 2.2 mm in average length (600 g) are dispersed in ε-caprolactam (2,400 g), the dispersion is subjected to polymerization and the produced polymer is processed to make chips. The chips (50 parts by weight) are admixed with chips of polycapramide containing no carbon fiber (50 parts by weight) under melting, and the mixture is injection molded to prepare a molded product.

The tensile strength, the tensile modulus of elasticity and the abrasion amount of the molded product are 720 kg/cm², 35 ton/cm² and $72 \times 10^{-8}$ cm³·min/kg·m·hr, respectively. No injury is found on the surface of the other material after the abrasion test.

EXAMPLE 7

ε-Caprolactam (2,550 g), water (270 g) and acetic acid (2.45 g) are heated at 80°C to melt, pitch precursor fibers of low modulus of elasticity of 0.5 mm in average length (tensile strength, 8 ton/cm²; tensile modulus of elasticity, 400 ton/cm²) (450 g) or acrylonitrile precursor fibers of 0.5 mm in average length (tensile strength, 20 ton/cm²; tensile modulus of elasticity, 2,000 ton/cm²) (450 g) are added thereto while stirring to make a uniform dispersion. As in Example 1, the dispersion is subjected to polymerization, the resultant polymer is processed to make chips and the chips are injection molded to make a molded product [hereinafter referred to as "molded product (K)" or "molded product (L)"].

The bending strength and the bending modulus of elasticity of the molded products (K) and (L) before and after treatment for water absorption of 60°C for 4 hours are measured.

The results are shown in Table 5.

Table 5

| Property | Molded product | K (containing pitch precursor fibers) | L (containing acrylonitrile precursor fibers) |
|---|---|---|---|
| Bending strength (kg/cm²) | Before water absorption | 1500 | 1530 |
| | After water absorption | 900 | 720 |
| Bending modulus of elasticity (ton/cm²) | Before water absorption | 45 | 69 |
| | After water absorption | 22 | 31 |

From Table 5, it is understood that the pitch carbon fibers themselves are relatively small in tensile strength and tensile modulus of elasticity but the molded product containing them shows higher tensile strength and tensile modulus of elasticity than the molded product containing acrylonitrile carbon fibers does.

What is claimed is:

1. A process for preparing a carbon fiber-reinforced polyamide resin which comprises incorporating carbon fibers of about 0.1 to 5mm in average length into the polymerization system of monomeric components capable of forming a polyamide resin prior to or in the course of the polymerization and then accomplishing the polymerization, said carbon fibers being incorporated in an amount of about 3 to 60% by weight of the total weight of the monomeric components and the carbon fibers, and the relationship between the amount of the carbon fibers to be incorporated and the average length of the carbon fibers to fall within the hatched area of FIG. 1 in the accompanying drawings.

2. The process according to claim 1, wherein the carbon fibers are pitch precursor fibers.

3. The process according to claim 1, wherein the carbon fibers are acrylonitrile precursor fibers.

4. A carbon fiber-reinforced polyamide resin prepared by the process according to claim 1.

* * * * *